US011547092B2

(12) United States Patent
Allen (10) Patent No.: US 11,547,092 B2
(45) Date of Patent: Jan. 10, 2023

(54) SPECIAL SEARCH DOG PACK AND PROCESS FOR FASTER DOG AIDED SEARCH, DOG ONLY SEARCH AND RESCUE, AND OTHER DOG AIDED USES

(71) Applicant: Dann M Allen, Hartford City, IN (US)

(72) Inventor: Dann M Allen, Hartford City, IN (US)

( * ) Notice: Subject to any disclaimer, the term of this patent is extended or adjusted under 35 U.S.C. 154(b) by 0 days.

(21) Appl. No.: 16/666,289

(22) Filed: Oct. 28, 2019

(65) Prior Publication Data
US 2021/0022320 A1 Jan. 28, 2021

Related U.S. Application Data

(63) Continuation-in-part of application No. 15/098,809, filed on Apr. 14, 2016, now abandoned.

(51) Int. Cl.
*A01K 29/00* (2006.01)
*A01K 27/00* (2006.01)
*A01K 11/00* (2006.01)

(52) U.S. Cl.
CPC .......... *A01K 27/008* (2013.01); *A01K 11/008* (2013.01); *A01K 27/002* (2013.01); *A01K 29/00* (2013.01)

(58) Field of Classification Search
CPC .... A01K 27/002; A01K 27/008; A01K 29/00; B68C 1/20
USPC ................... 119/850, 858; 54/37.1
See application file for complete search history.

(56) References Cited

U.S. PATENT DOCUMENTS

| 7,602,302 | B2 * | 10/2009 | Hokuf | .................. A01K 11/008 340/539.13 |
| 8,041,664 | B1 * | 10/2011 | Lambert | ................ G06N 3/004 706/46 |
| 2008/0127905 | A1 * | 6/2008 | Ramon | .................... G01V 9/00 119/718 |
| 2009/0018875 | A1 * | 1/2009 | Monatesti | ........ G06Q 10/06316 705/7.26 |
| 2016/0302390 | A1 | 10/2016 | Allen | |

FOREIGN PATENT DOCUMENTS

| CN | 105044751 A | 11/2015 |
| CN | 204766196 U | 11/2015 |
| EP | 2974597 | * 1/2016 |

* cited by examiner

*Primary Examiner* — David J Parsley
(74) *Attorney, Agent, or Firm* — Ritchison Law Offices PC; John D Ritchison (57) ABSTRACT

This device and process is a Special Search Dog Pack and Process for Faster Dog Aided Search, Dog Only Search and Rescue and other Dog Aided Uses for enabling Faster, Dog-Only Search. Particularly this process uses a search pack device that contains specific rescue contents used for and related to a faster search method. Here, the search dog has an attached pack with a tracking device and rescue contents that can be carried directly to a victim without the need of an attending person. Once found the victim can then communicate back to a search party and/or the search party can quickly and accurately locate the victim via the cell phone or GPS device for a precise and faster rescue.

12 Claims, 7 Drawing Sheets

Fig. 7  110      Remote Dog Handler Search and Rescue

Step 1. Prepare and Train
a. Choose accomplished search dog and handler
b. Prepare pack device with attachments
c. Train with attachments – transmitter and receiver, microphone and speakers, camera, smoke detectors, heat sensors, verbal commands, two-way narrative (victim or other human).
d. Initial training handler present, then advance to handler remote
e. practice grid, scent and structured command searches

Step 2: Train with Auxiliary Devices
a. practice grid layouts over various terrains – mountains, forest, streams, lakes, marshes, and urban settings, scent and structured command searches
b. Coordinate camera images with satellite map images
c. Practice deploying boost towers at location of search

Step 3: Identify Target Victim
a. Identify the Target victim;
b. Obtain as much information about the victim and circumstances as feasible;
c. Identify a last known location of the victim and set up perimeter time lost X speed of travel
d. Obtain scented items of victim if available
e. Coordinate satellite telescopes, real time mapping

Step 4: Select Team and Search
a. Select Search and Rescue Team
b. Determine Scent, Grid or directed search
c. Select Dog and Handler
d. Travel with emergency gear to search location and set up boost tower and command post to remote hand

Step 5: Search
a. Release Search Dog
b. Prepare for contact with victim – first aid, helicopter/airlift, drone
c. Adjust/ modify search if find signs/ property of victim
d. Coordinate Handler directions with satellite mapping
e. Release Drone if needed

Step 6: Contact with Victim
a. Determine condition – alive, injured, critically injured, dead
b. Deploy additional search dogs with supplies
c. Send airlift helicopter or pick-up team

Step 7: Conduct a Post Search Review
a. Conduct Lessons Learned
b. Replenish supplies
c. Repeat S and R

SPECIAL SEARCH DOG PACK AND PROCESS FOR FASTER DOG AIDED SEARCH, DOG ONLY SEARCH AND RESCUE, AND OTHER DOG AIDED USES

CROSS-REFERENCE TO RELATED APPLICATIONS

This application for a Special Search Dog Pack and Process for Faster Dog Aided Search, Dog Only Search and Rescue and other Dog Aided Uses and is a Continuation-in-Part [C.I.P.] filed under 37 CFR 1.53(b) and claims the benefit of the original, non-provisional (Regular Utility) U.S. patent application Ser. No. 15/098,809 submitted Apr. 14, 2016 and published as US 2016/0302390 A1 on Oct. 20, 2016. The original application was still active on the date of the submission of this C.I.P. The original is entitled a "Special Search Dog Pack and Process for Faster Dog-Only Search" and was submitted by Dann M. Allen, inventor. The original application is incorporated fully by reference as if it were reproduced here, verbatim. The original application claims the benefit of United States Provisional Patent Application with Ser. No. 62/147,010 filed Apr. 14, 2015 by Dann M. Allen and entitled "Special Search Dog Pack and Process for Faster Dog-Only Search".

FIELD OF INVENTION

This invention relates to a Special Search Dog Pack and Process for Faster Dog Aided Search, Dog Only Search and Rescue and other Dog Aided Uses. Particularly this search pack device/product and process is related to a faster search means wherein the search dog has an attached pack with contents that may be carried directly to a victim without the need of an attending person. Once found the victim may communicate back to a search party and/or the search party may quickly and accurately locate the victim for a more precise and faster rescue.

Moreover, this device and process is a Special Search Dog Pack and Process for Faster Dog Aided Search, Dog Only Search and Rescue and other Dog Aided Uses. Particularly this process uses a search pack device that contains specific rescue contents used for and related to a faster search method. Here, the search dog has an attached pack with a tracking device and rescue contents that can be carried directly to a victim without the need of an attending person. Once found the victim, dog handler, and/or dog can then communicate back to a search party and/or the search party can quickly and accurately locate the victim via the cell phone or GPS device for a precise and faster rescue.

FEDERALLY SPONSORED RESEARCH

None.

SEQUENCE LISTING OR PROGRAM

None.

BACKGROUND—FIELD OF INVENTION AND PRIOR ART

Background and Problem Solved

As far as known, there are no Special Search Dog Pack and Process for Faster Dog Aided Search, Dog Only Search and Rescue and other Dog Aided Uses or the like. It is believed that this product and process are unique in its design and technologies.

When one is out hiking and then realizes he has passed the same dead tree for the third time, and sundown is 20 minutes away, a dog looking for a game of tug-of-war might be his best chance at making it home. Search-and-rescue dogs are smart, agile and obedient, but their high "play drive" is what makes them look for a missing person through snow and rain, down steep rock walls and in crevices that would make a claustrophobic run screaming. At its most basic, the job of a SAR dog has two components: First—Find the origin of a human scent and let the handler know where it is. So how do S-A-R Dogs work? All humans, alive or dead, constantly emit microscopic particles bearing human scent. Millions of these are airborne and are carried by the wind for considerable distances. The air scenting SAR dog is trained to locate the scent of any human in a specific search area. The dog is not restricted to the missing person's track and can search long after the track is obliterated. Many air scenting search dogs are also trained in trailing/scent discrimination.

Upon arrival at the search site, dog handlers normally work directly for their unit's operations leader, who reports to the local search boss or incident commander of the local agency. Many units provide their own base camp operation, with trained radio operators, SAR dog advisors, and other support personnel. Second, after the initial hasty searches of trails and paths, each dog/handler team is usually assigned a segment of the overall search area to cover systematically. Dog handlers work their dogs downwind of the section assigned to them or cover the area in a way that provides dogs with the best scenting coverage. Handlers map the area they have covered and report their POD (probability of detection) to the plans section or operations leader upon completing their assignments.

Search dogs can work in areas where other searchers have been, and they can work with other search resources, such as man-trackers. Using scent articles, they can discriminate for the missing person in heavily populated areas. They can work day or night, in most kinds of weather, and are especially effective where human sight is most limited—in the dark, in dense woods or heavy brush, in debris (as found in earthquakes, floods, and tornadoes) and under water.

Experts estimate that a single SAR dog can accomplish the work of approximately 20 to 30 human searchers. It's not just about smell either—a dogs' superior hearing and night vision also come into play. Time is always an issue in search and rescue. In an avalanche situation, for instance, approximately 90 percent of victims are alive 15 minutes after burial; upon 35 minutes after burial, only about 30 percent of victims are alive. While most avalanche victims don't survive, their chances increase exponentially when dogs are a part of the search. Even in cases where victims are presumed dead, dogs are invaluable assets—they locate the bodies so family members can have closure and give their loved one a proper burial.

SAR dogs can do a lot of amazing things, including rappel down mountainsides with their handler, locate a human being within a 500-meter radius, find a dead body under water, climb ladders and walk across an unstable beam in a collapsed building, but it's all toward a single end-find and identify the location of a victim.

While some dogs exhibit a stronger desire to scent than others, every canine out there has a powerful sense of smell. SAR dogs may be purebreds or mutts. Some handlers have a breed of choice, but any medium-to-large dog in good physical health, with decent intelligence, good listening skills, a non-aggressive personality and a strong play/prey drive (an intense, enduring desire to retrieve a toy) can potentially go into search and rescue. SAR dogs need to be big enough to successfully navigate treacherous terrain and push debris out of the way and yet small enough to transport easily. One actually cannot find too many Saint Bernard search dogs these days, because they can be cumbersome. German shepherds are a popular SAR breed—they're typically smart, obedient and agile, and their double-layered coat insulates against severe weather conditions. Hunting and herding dogs like Labrador and golden retrievers and border collies tend to be good at SAR work, too, because they have a very strong prey drive. Many people consider bloodhounds to be the best breed for tracking—their giant ears and facial folds serve to collect and concentrate scent particles right at their nostrils, making their sense of smell extremely powerful and discerning. A bloodhound can pick up a trail weeks after other breeds can't find it. This brings us to a distinction between types of SAR dogs: Some dogs track, while other dogs search.

Not all SAR dogs perform the same type of search. Some dogs are tracking (or trailing) dogs, and others are air-scent (or area-search) dogs. The types overlap, but the distinction between the two guides are the training process and how the dog participates in missions. Tracking dogs work with their nose to the ground. They follow a trail of human scent—typically heavy skin particles that fall quickly to the ground or onto bushes—through any type of terrain. These dogs are not searching, they're following: Tracking dogs need a "last seen" starting point, an article with the person's scent on it to work from and an uncontaminated trail.

For tracking, time is an issue. If a child disappears from a school playground or an inmate escapes from a prison, a tracking dog might be called in to follow the person's scent immediately after the disappearance, before other search groups and law-enforcement personnel contaminate the scent trail.

Air-scent dogs, on the other hand, work with their nose in the air. They pick up human scent anywhere in the vicinity—they don't need a "last seen" starting point, an article to work from or a scent trail, and time is not an issue. Whereas tracking dogs follow a particular scent trail, air-scent dogs pick up a scent carried in air currents and seek out its origin—the point of greatest concentration. Air-scent dogs might be called in to find a missing hiker located "somewhere in a national park," an avalanche victim beneath 15 feet of snow or people buried under a collapsed building. Air-scenters might specialize in a particular type of search.

Scientist believe today's German shepherd are more closely related to the Asian wolf. So, How far can wolves travel? Wolves are hunters, and they travel far and wide to locate prey. They may travel 50 miles or more each day in search of food, and they are superbly designed for a life on the move. Because their elbows turn inward, their lean bodies are precisely balanced over their large feet. With their long legs and ground-eating stride, they can travel tirelessly for hours on end with no energy wasted. Dispersing wolves, those leaving packs in search of their own mates, have been known to travel hundreds of miles away from their home territory. Satellite and Global Positioning Satellite (GPS) collars allow researchers to document the truly remarkable travels of wolves. How fast can wolves run and how far do they travel? Wolves trot at 5 miles per hour, but they can run in short bursts at up to 35 miles per hour. They can travel as much as 50 miles per day hunting for food, all while tracking prey and traversing rugged terrain.

Problem Solved

As discussed above, SAR animals work well at quickly finding the victims. However the limitations of just finding a victim are: the time lost for the rescue team to catch-up to the dog or to penetrate or overcome the terrain—rocky cliffs, water, thickets and difficult ravines. What is needed is a way to immediately target the location, provide food and liquids, provide communication and provide warmth or a buffer from the weather and temperatures. The Special Search Dog Pack and Process for Faster Dog Aided Search, Dog Only Search and Rescue and other Dog Aided Uses solves these shortcomings in the SAR process as will be discussed in the following summary, description and operation.

Prior Art

As far as known, there are no Special Search Dog Pack and Process for Faster Dog Aided Search, Dog Only Search and Rescue and other Dog Aided Uses or the like. Other search dog patents are few. A Chinese patent CN204766196U teaches a first that relates to dogs first-aid kit are equipped to policeman work technique of patrol dog. The utility model discloses by the medicine, surgical instruments, oxygen therapy equipment triplex, adopt the portable aluminum alloy box body, the high 170 mm of long 515 mm, the 370 wide mm of box, the box uses aluminum alloy extrusions as the skeleton, orange fire proof board material is pasted on the surface, is furnished with a English handle, two barbecue locks, two six hinges, limit and minute do not use packet strip and cornerite to consolidate, it is equipped with pocket and elastic cord to go up the cap rock in the box, the intermediate layer is slight high density fiberboard, the built-in EVA foamed material who has various customized shapes of bottom. This does not show or anticipate the Allen application.

Another disclosure is CN105044751A that shows and demonstrates a police dog rescue and state monitoring system based on big dipper, which solves the problem that the police dog positioning function of the prior art is unitary. The police dog rescue and state monitoring system based on big dipper disclosed by the invention comprises a central control station and an information module; the central control station consists of an antenna reception unit, a spectrum-spreading reception unit, an upper computer, a monitoring software and a central control station power supply module; the antenna reception unit is connected to the spectrum-spreading reception unit; the spectrum-spreading reception unit is connected to an upper computer; the monitoring software is installed on the upper computer; the information collection module consists of a big dipper navigation positioning module, a temperature sensor, a breath sensor, a micro-camera, a wireless emission module, a spectrum-spreading transmission module and an information collection power supply module; the big dipper navigation positioning module, the temperature sensor, the breath sensor and the micro-camera are connected to the wireless emission module; and the wireless emission module is connected to the antenna reception unit of the central control station through the spectrum-spreading module. It shows a position sensor but not rescue items and communication means for the victim.

U.S. Pat. No. 7,602,302 shows embodiments that provide a tracking apparatus and method that are operable to efficiently track an animal. The tracking apparatus is operable to be worn by an animal, determine its current geographic location, and transmit information relating to its current geographic location to an external device such as a portable navigation unit. The navigation unit is operable to display a representation of the geographic location of the tracking apparatus for consideration by a user. This fails to show the emergency supplies for the victim as demonstrated by the Allen device and system. As far as known, there are no Special Search Dog Pack and Process for Faster Dog Aided Search, Dog Only Search and Rescue and other Dog Aided Uses or the like.

SUMMARY OF THE INVENTION

This invention is a Special Search Dog Pack and Process for Faster Dog Aided Search, Dog Only Search and Rescue and other Dog Aided Uses. The preferred embodiment of the Special Search Dog Pack and Process for Faster Dog Aided Search, Dog Only Search and Rescue and other Dog Aided Uses is comprised of a special set of product encompassed in the search pack. These are useful and need to be with an SAR dog independent of an immediate dog handler. The SAR pack contains a group of contents from the group consisting of:

| Item | Description Option | Light Weight Option ounces | Heavy Weight Option ounces |
|---|---|---|---|
|  | Water pouch with gravity water filter |  |  |
| 1 | water | 32 | 34 |
| 2 | filter | 2.4 | 17 |
| 3 | Power bars | 2.29 | 2.29 |
| 4 | Water proof matches | 0.45 | 1 |
| 5 | Space blankets. 84" × 56" | 2.88 | 10 |
| 6 | Satellite phone | 7.1 | 7.68 |
| 7 | Signal with human only activated switch | 3 | 10 |
| 8 | Sun screen | 1 | 2 |
| 9 | Salt | 0.1 | .25 |
| 10 | Some first aid | 3 | 13 |
| 11 | Scent-proof bag | 1 | 2 |
| 12 | Flashlight | 2 | 5 |
| 13 | Head cover | 2.5 | 2.5 |
| 14 | Person/s info being sought | 0.1 | 1 |
| 15 | Bug repellent | 1 | 1 |
| 16 | Dog backpack | 16 | 32 |
| 17 | Lighter | 0 | 2 |
| 18 | razor knife | 0 | 1.7 |
| 19 | Signal device for dogs to follow | 0 | 10 |
| Total | Ounces - oz. | 76.82 | 154.42 |
| Total | Pounds - Lbs. | 4.8 | 9.625 |

An alternative embodiment is a scent dog pack, with a unique scent for other dogs to pick up without attracting other unwanted animals and/or masking a dog scent. The unique scent would be a scent easy to follow so that the dogs can travel faster to join up with fellow dogs. Example; Used when an article belonging to a lost person is found in an area where one dog was assigned to, the other dogs would be called off of their areas and sent to the found arctic area. The incoming dogs could easily pick up the unique smell/s left from the dog in the item area.

The newly invented Special Search Dog Pack and Process for Faster Dog Aided Search, Dog Only Search and Rescue and other Dog Aided Uses may be manufactured or assembled at low volumes by very simple means and in high volume production by more complex and controlled systems.

OBJECTS AND ADVANTAGES

There are several objects and advantages of the Special Search Dog Pack and Process for Faster Dog Aided Search, Dog Only Search and Rescue and other Dog Aided Uses for lost victims. There are currently no known Special Search Dog Pack and Process for Faster Dog Aided Search, Dog Only Search and Rescue and other Dog Aided Uses that are effective at providing the objects of this invention.

A dog can cover more ground with better sensory perception than the humans. While humans are pulling on the dog's leash, at the same time, the dog is pulling back, wearing both handler and dog out sooner. Look at all the photos with a dog and leash, the leash is pulled tight, the dog is pulling the handler, and the handler is pulling back too, wasting energy for both.

When someone/s is deemed missing, one person can send out many dogs to the last known area of the missing person/s in almost any weather and time of day. The search dogs would be carrying backpacks with very important essentials (to be determined by R&S from that area and time of year) to the missing person/s quicker than S&R personnel can. The essentials would help with saving life and/or limb. This will be done as a first step while the S&R is getting ready and informed. The dog's pack would also carry important transmission devices to help with the location of person/s missing. Some controls on the devices could only be controlled by humans only to help with false alarms. The search dogs would not need to: be briefed, wait to sunrise, or wait for better weather and so on.

The dog's main objective would be to find the missing person/s and deliver the contents of its backpack to the missing person/s. At that time it would be up to the handler if the dog should return or stay with the found person/s. Finding the missing person/s may be found in good condition just feet from the trail and no R&S may be required at all by talking the found person/s back to the trail/terminal. When the dog finds the missing person/s by stopping for a predetermined time or dog giving a signal back the handler, and no signal is sent back to handler by a human controlled transmitter, then the remote satellite phone's camera and other devices can be turned to survey the area. If a person is trapped up in a tree by a wild animal and the dog should not encounter the animal or is unable to chase the animal away, then the R&S team would know to bring the proper equipment. If the satellite phone's camera is turned on and the person/s that are obviously expired then a SAR team may not be required.

When watching videos of SAR with dogs, it seems that the dogs are pulling against the trainer while the trainer is pulling back expending unneeded energy from both dog and handler. The dogs seem, to me to be able to leave the trainer far behind while staying on the scent. With this invention: The backpacks would be preloaded and ready to be put on the dogs in seconds then loaded into the transport (See contents); Dog's pack easily converts into fanny pack for humans; The dogs would be transported to where someone was missing; The dogs could be given a scent or find a scent and then let loose; and The dogs could be given commands. (See commands).

Plus: the Pouch converts into a fanny or back pack for humans and there are specific command signals for dogs. The cell or satellite phones are a type of unit that only a humans can turn on/power-up in hand or remotely. Also if a signal is given off when a dog has been at certain location for predetermined amount of time, a remote activated satellite phone camera and video could power on. These devices would be in a clear protective pouch in/on dog's pouch for the satellite phone and/or transmitter keeping them safe along with the pack loaded with essentials.

A Typical Pouch Contents:

| | |
|---|---|
| Water pouch with gravity water filter | Scent-proof bag |
| Water and filter | Flashlight |
| Power bars | Head cover |
| Water proof matches | Person/s info being sought |
| Space blankets. 84" × 56" | Bug repellent |
| Satellite phone | Dog backpack |
| Signal with human only activated switch | Lighter razor knife and a |
| Sun screen | Signal device for dogs |
| Salt | to follow. |
| Some first aid | |

The Special Search Dog Pack and Process for Faster Dog Aided Search, Dog Only Search and Rescue and other Dog Aided Uses may decrease the rescue time and thus increase the chance of a successful rescue of various victims. Finally, other advantages and additional features of the present Special Search Dog Pack and Process for Faster Dog Aided Search, Dog Only Search and Rescue and other Dog Aided Uses device and process will be more apparent from the accompanying drawings and from the full description of the device. For one skilled in the art of search and rescue devices and processes, especially involving dogs, it is readily understood that the features shown in the examples with this product are readily adapted to other types of search and rescue pack devices or contents and processes.

DESCRIPTION OF THE DRAWINGS—FIGURES

The accompanying drawings, which are incorporated in and constitute a part of this specification, illustrate an embodiment of the Special Search Dog Pack and Process for Faster Dog Aided Search, Dog Only Search and Rescue and other Dog Aided Uses that is preferred. The drawings together with the summary description given above and a detailed description given below serve to explain the principles of the Special Search Dog Pack and Process for Faster Dog Aided Search, Dog Only Search and Rescue and other Dog Aided Uses. It is understood, however, that the Special Search Dog Pack and Process for Faster Dog Aided Search, Dog Only Search and Rescue and other Dog Aided Uses for search and rescue operations is not limited to only the precise arrangements and instrumentalities shown.

FIGS. 1 A through 1 D are sketches of the general Search and Rescue Device for rescue applications device.

FIGS. 2 A through 2 E are sketches of the general configurations of the rescue device with components and features noted.

FIGS. 3 A through 3 C are sketches of the general configurations of the rescue pack with components and features noted and the old traditional dog supply pack.

FIG. 7 is a process flowchart for a remote dog search activity.

DESCRIPTION OF THE DRAWINGS—REFERENCE NUMERALS

The following list refers to the drawings:

TABLE B

Reference numbers

| Ref # | Description |
|---|---|
| 30 | Search and Rescue Device 30 pack or case strapped to search dog 35 |
| 33 | Quick release connection 33 to remove pack or convert to human carry |
| 35 | Animal/Rescue Dog 35 |
| 40 | Human Rescue Trainer/handler/commander/owner 40 |
| 45 | remote handler 45 using speaker 98 on search dog 35 |
| 50 | Victim 50 |
| 70 | Traditional Liquid Replenishment 70 |
| 75 | old time traditional pack 75 with assist dog |
| 80 | Zone of Victim Scents 80 |
| 81 | wireless transmitter and receiver 81 with built in speaker and microphone |
| 82 | small and powerful microphone 82 (RODErtm and the like) |
| 83 | Global Positioning Sensor (GPS) 83 |
| 84 | attachment and base 84 of camera 86 |
| 85 | rotational shaft 85 |
| 86 | multi-direction camera 86 (DJI Osmortm and the like with speaker and microphone) |
| 88 | smoke detector 87 |
| 88 | boost tower 88 |
| 89 | thermal detectors (heat sensors) 89 |
| 90 | completed path 90 of search dog 35 |
| 91 | satellite telephone with transmitter 91 |
| 92 | cellular telephone 92 |
| 93 | search and rescue team 93 at site |
| 95 | future path 95 of search dog 35 |
| 96 | scent search 96 by search dog 35 |
| 97 | grid search 97 by search dog 35 |
| 98 | speaker 98 on search dog 35 |
| 99 | light 99 on search dog 35 pack 30 |
| 100 | remote search 100 |
| 110 | remote search process 110 |

DETAILED DESCRIPTION OF PREFERRED EMBODIMENT

The present development relates to a Special Search Dog Pack and Process for Faster Dog Aided Search, Dog Only Search and Rescue and other Dog Aided Uses. Particularly this search pack device/product and process is related to a faster search means wherein the search dog has an attached pack with contents that may be carried directly to a victim without the need of an attending person. Once found the victim may communicate back to a search party and/or the search party may quickly and accurately locate the victim for a more precise and faster rescue. Moreover, this device and process is a Special Search Dog Pack and Process for Faster Dog Aided Search, Dog Only Search and Rescue and other Dog Aided Uses. Particularly this process uses a search pack device that contains specific rescue contents used for and related to a faster search method. Here, the search dog has an attached pack with a tracking device and rescue contents that can be carried directly to a victim without the need of an attending person. Once found the victim can then communicate back to a search party and/or the search party can quickly and accurately locate the victim via the cell phone or GPS device for a precise and faster rescue.

This device is a Special Search Dog Pack and Process for Faster Dog Aided Search, Dog Only Search and Rescue and other Dog Aided Uses. Particularly this search pack device with specific rescue contents and is related to a faster search means wherein the search dog has an attached pack with the rescue contents that can be carried directly to a victim without the need of an attending person on site. Once found the victim can communicate back to a search party and/or the search party may quickly and accurately locate the victim for a more precise and faster rescue. Search and Rescue (SAR) animals work well at quickly finding the victims. However, the limitations of just finding a victim are: the time lost for the rescue team to catch-up to the dog or to penetrate or overcome the terrain-rocky cliffs, water, thickets and difficult ravines. What is needed is a way to immediately target the location, provide food and liquids, provide communication and provide warmth or a buffer from the weather and temperatures. The Special Search Dog Pack and Process for Faster Dog Aided Search, Dog Only Search and Rescue and other Dog Aided Uses solves these shortcomings. When a person/s are deemed lost, these trained dogs will have their packs put on them, loaded into a vehicle then transported to the site and let loose. The importance of this is, no time is wasted, most dogs are always ready day or night and in any weather. The dog handlers are watching their dog on a monitor where ever they may be, even hundreds of miles away, giving commands as needed through a speaker or other indicators through devices such as a satellite phone or etc. Humans only slow down dogs. Anytime a leash is pulled tight that is wasted energy for both the human and the dog. Scientist believe today's German shepherd are more closely related to the Asian wolf. Wolves trot at 5 miles per hour, but they can run in short bursts at up to 35 miles per hour. They can travel as much as 30 miles per day hunting for food. So let the dogs do their thing without the slow humans. Danelle Ballengee was only about one mile in when the search and rescue arrived on site, only 2-20 mins from the rescuers starting point. Once the dog/s find the missing people, the satellite phone can be used either by the dog handler or the now found people. If the dog handler uses a camera via the satellite phone or the camera from the satellite phone to evaluate the situation, for example the hiker/s could be only be a few 100 feet from the trail and they are in good condition, the hiker/s can be talked back to the trail by the dog handler or the dog can commanded to take them back to the trail, then no humans are need to go out and the dogs are called back in. If the dog/s comes upon death, then a human recovery team would be deployed. If the dogs come upon a bear keeping a hiker in a tree, and if there nothing the dog can do then another human team is dispatched out. The pack can be removed from the dog and turned into an adjustable belt pack for the human if the newly found people are not safe at their present location.

This process uses designed packs already known they will always be changing from inputs of the people using them, weather elements, terrain, and many other foreseen and unforeseen challenges. The advantages for the Special Search Dog Pack and Process for Faster Dog Aided Search, Dog Only Search and Rescue and other Dog Aided Uses are listed above in the introduction. The preferred embodiment of the Special Search Dog Pack and Process for Faster Dog Aided Search, Dog Only Search and Rescue and other Dog Aided Uses—SAR pack—could contains a group of contents from the group consisting of:

| | |
|---|---|
| Water pouch with gravity water filter (Water and filter) | Scent-proof bag |
| Power bars | Flashlight |
| Water proof matches | Head cover |
| Space blankets. 84" × 56" | Person/s info being sought |
| Satellite phone | Bug repellent |
| Signal with human only activated switch | Dog backpack |
| Sun screen | Lighter |
| Salt | razor knife and |
| Some first aid | a Signal device for dogs to follow |

There is shown in FIGS. 1 through 7 a complete description and operative embodiment of the Special Search Dog Pack and Process for Faster Dog Aided Search, Dog Only Search and Rescue and other Dog Aided Uses device and process. In the drawings and illustrations, one notes well that the FIGS. 1 through 7 demonstrate the general configuration and use of this product and process. The various example uses are in the operation and use section, below.

The accompanying drawings, which are incorporated in and constitute a part of this specification, illustrate an embodiment of the Special Search Dog Pack and Process for Faster Dog Aided Search, Dog Only Search and Rescue and other Dog Aided Uses 30 that is preferred. The drawings together with the summary description given above and a detailed description given below serve to explain the principles of the Special Search Dog Pack and Process for Faster Dog Aided Search, Dog Only Search and Rescue and other Dog Aided Uses 30. It is understood, however, that the Special Search Dog Pack and Process for Faster Dog Aided Search, Dog Only Search and Rescue and other Dog Aided Uses 30 is not limited to only the precise arrangements and instrumentalities shown. Other examples of search and rescue contents, processes and uses are still understood by one skilled in the art of search and rescue pack devices and processes to be within the scope and spirit shown here.

FIGS. 1 A through 1 D are sketches of the general Search and Rescue Device 30 for rescue applications device. Demonstrated in these views are the Search and Rescue Device 30, Animal/Rescue Dog 35, and Traditional Liquid replenishment 70.

Figure 1A:
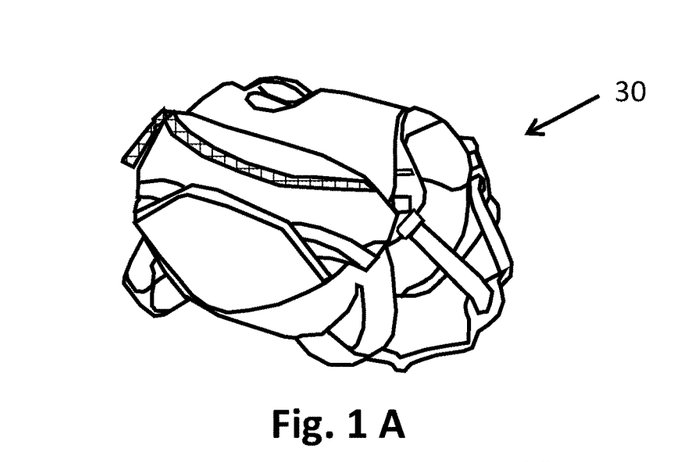
Figure 1B:
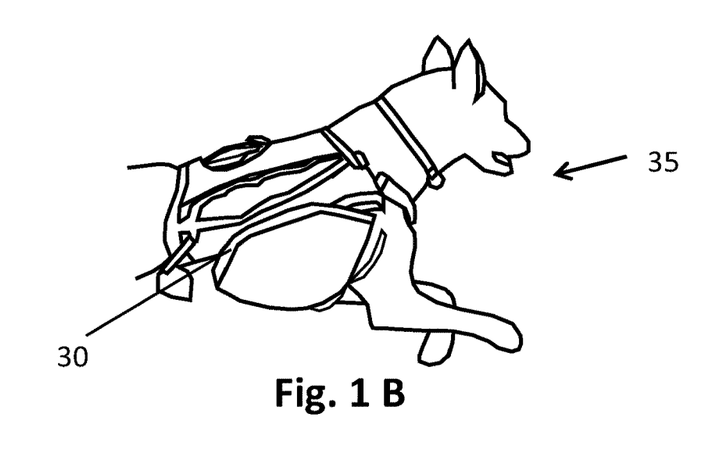
Figure 1C:
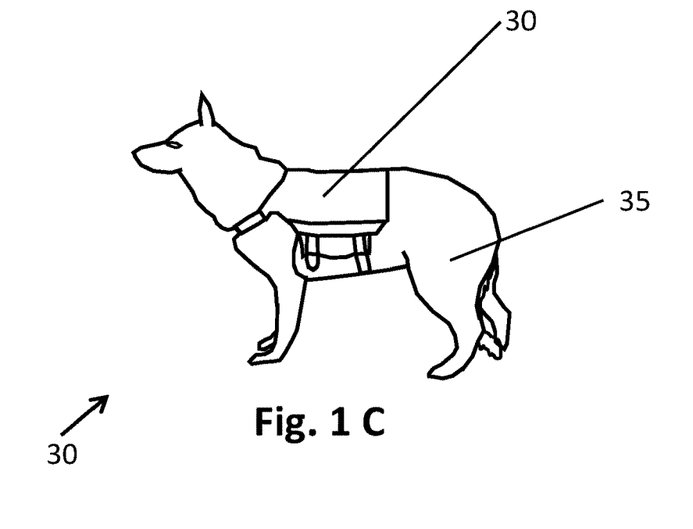
Figure 1D:
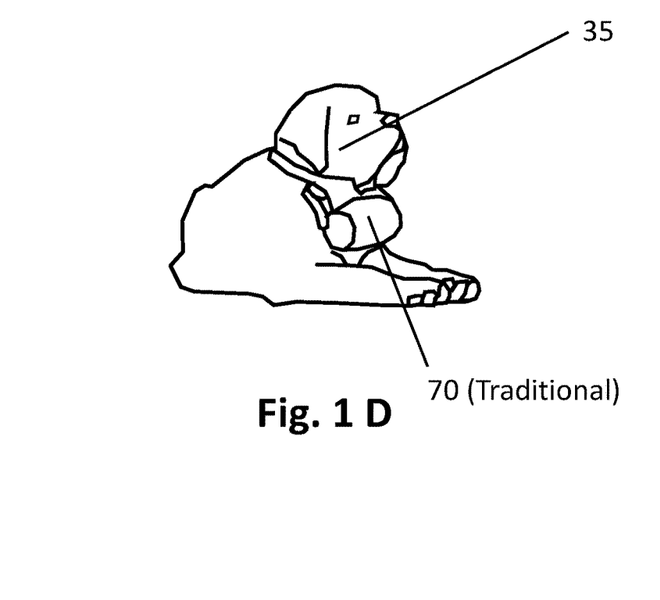
Figure 2:
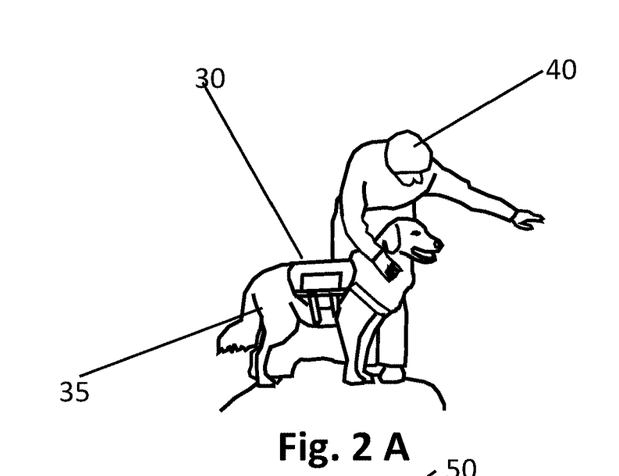

FIGS. 2 A through 2 E are sketches of the general configurations of the rescue device 30 with components and features noted. These sketches show the Search and Rescue Device 30; an Animal/Rescue Dog 35; a Human Rescue Trainer 40; a Victim 50; the Traditional Liquid Replenishment 70; and a Zone of Victim Scents 80. In FIG. 2 B the SAR dogs find missing persons, search disaster areas for survivors and bodies and locate evidence at crime scenes, all by focusing on the smell of a human being. To people, this may seem like a difficult task. But to dogs, whose sense of smell is about 40 times stronger than a person's, it's a snap. To a dog, the scent of a human is as powerful and distinctive as the smell of a freshly baked apple pie is to a person. Human beings are smelly creatures—they constantly shed dead skin cells called rafts, which contain bacteria and smell distinctly human. While it's impossible to know for sure, most experts believe that SAR dogs are smelling these rafts, which form a "scent cone" that the dog can easily pinpoint, when they're performing a search. Everyone's skin cells smell unique, which is how a dog can smell an item of clothing and search specifically for the last person who wore it.

Figures 3A, 3B, 3C:
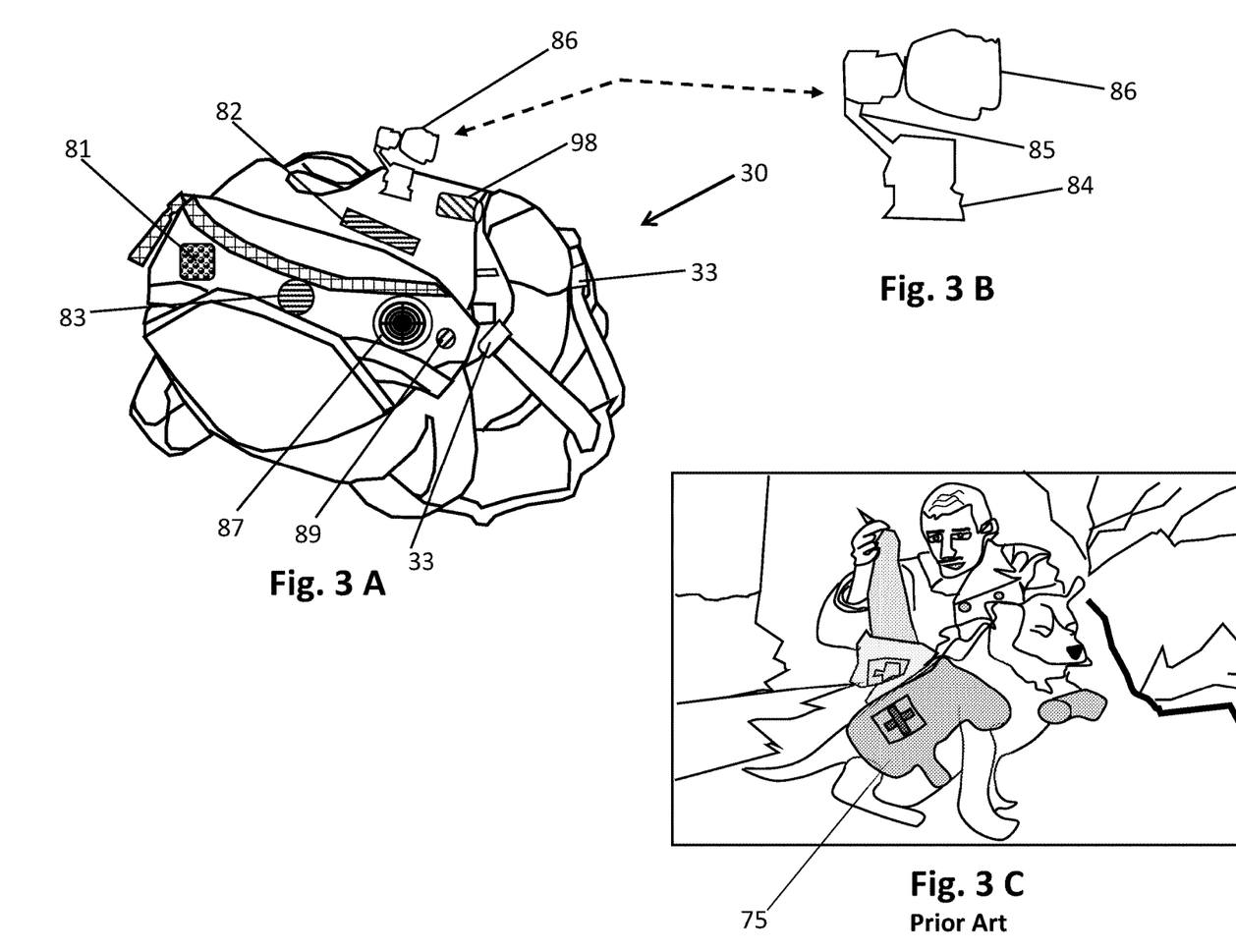

FIGS. 3 A through 3 C are sketches of the general configurations of the rescue pack 30 with components and features noted and the old traditional dog supply pack 75.

Provided and shown here are: a Search and Rescue Device 30 pack or case able to be strapped to search dog 35; a pair of quick release connection 33 to remove pack or convert to human carry; an old time traditional pack 75 with assist dog; a zone of Victim Scents 80; a wireless transmitter and receiver 81 with built in speaker and microphone; a small and powerful microphone 82 (RODE® and the like); a Global Positioning Sensor (GPS) 83; a attachment and base 84 of camera 86; a rotational shaft 85; a multi-direction camera 86 (DJI Osmo® and the like with speaker and microphone); a smoke detector 87; and a thermal detectors (heat sensors) 89. Not shown but well known by persons in the art are a satellite telephone 91 and a cellular telephone 92. In FIG. 3 C is seen that a full dog pack was out as early as 1914. This Red Cross dog pack design, seen in this 1914 photograph is able to hold first aid kits, water, satellite phone, bug spray and etc. if it were used today.

Figure 4:
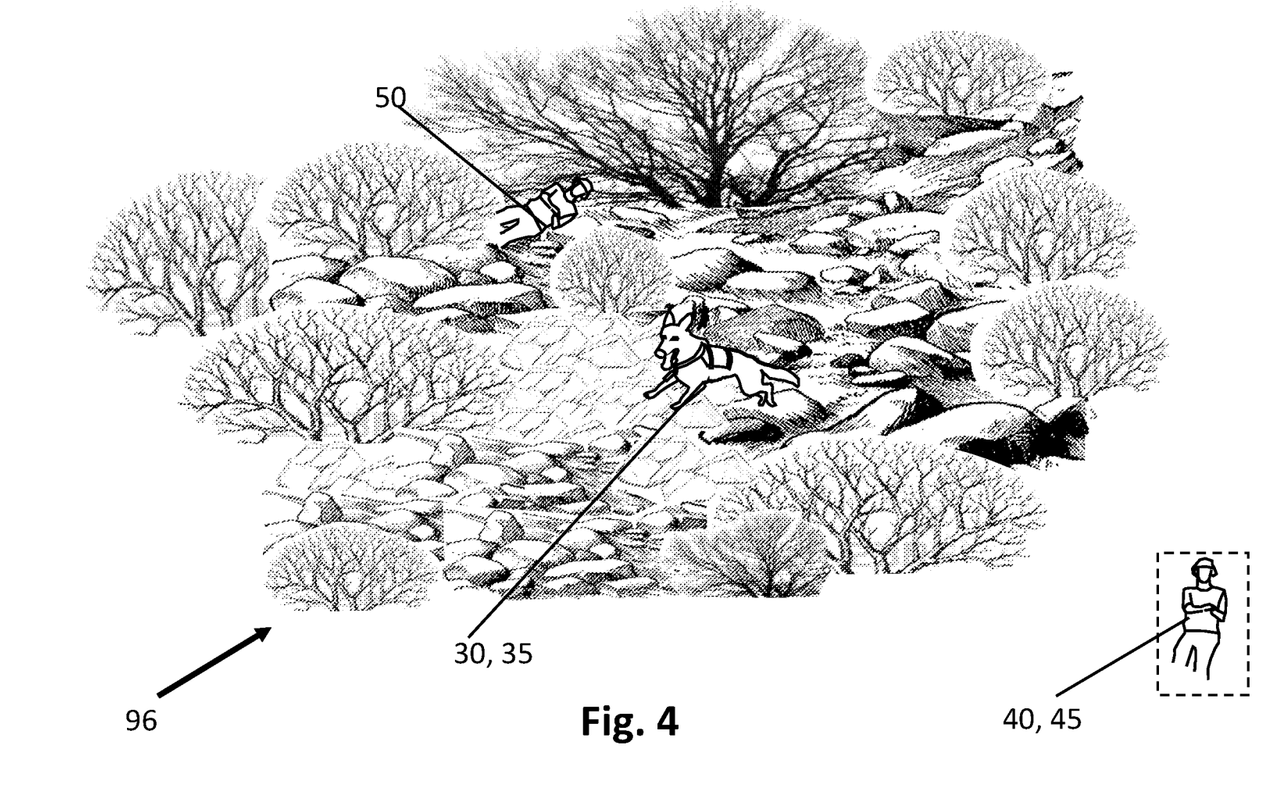
FIG. 4 is a sketch of a general scent search with a remote handler.
Figure 5:
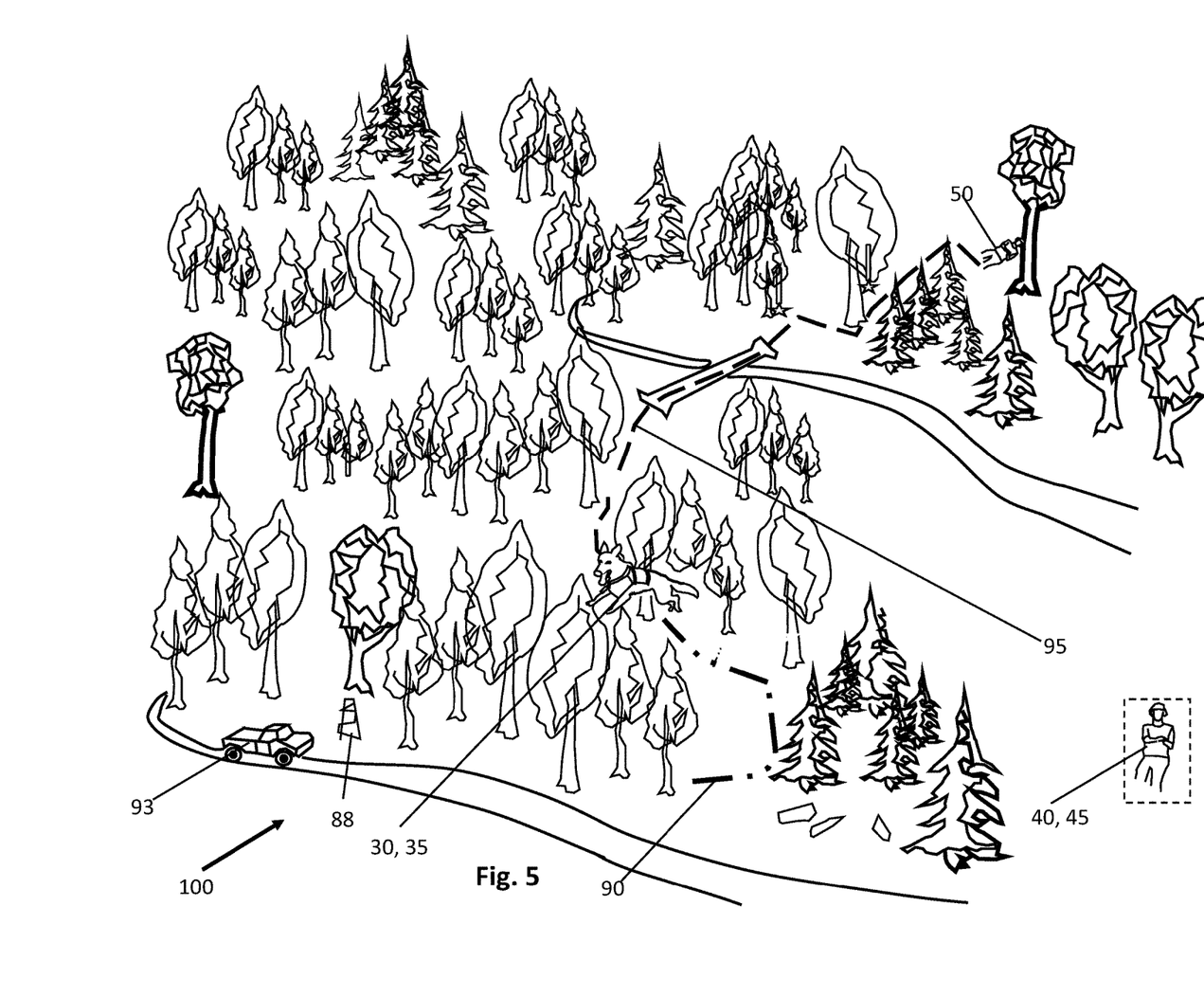
FIG. 5 is a sketch of the general search with the search dog and team at the site and a remote handler.

FIG. 4 a sketch of a general scent search, FIG. 5 a sketch of the general search with the search dog and team at the site and a remote handler, FIG. 5 is a grid search, and FIG. 7 a process flowchart for a remote dog search activity are described below in the Operation Section.

The details mentioned here are exemplary and not limiting. Other specific components and manners specific to describing a Special Search Dog Pack and Process for Faster Dog Aided Search, Dog Only Search and Rescue and other Dog Aided Uses 30 may be added as a person having ordinary skill in the field of search and rescue pack devices and their uses well appreciates.

OPERATION OF THE PREFERRED EMBODIMENT

The Special Search Dog Pack and Process for Faster Dog Aided Search, Dog Only Search and Rescue and other Dog Aided Uses 30 has been described in the above embodiment. The manner of how the device operates is described below. One notes well that the description above and the operation described here must be taken together to fully illustrate the concept of the Special Search Dog Pack and Process for Faster Dog Aided Search, Dog Only Search and Rescue and other Dog Aided Uses 30. The preferred embodiment of the Special Search Dog Pack and Process for Faster Dog Aided Search, Dog Only Search and Rescue and other Dog Aided Uses—SAR pack—contains a group of contents from the group consisting of:

| | |
|---|---|
| Water pouch with gravity water filter (Water and filter) | Scent-proof bag |
| | Flashlight |
| Power bars and dry high energy packs | Head cover |
| Water proof matches | Person/s info being sought |
| Space blankets such as 84 inch × 56 inch light weight | Bug repellent |
| | Dog backpack |
| | Lighter |
| Signal with human only activated switch | razor knife and a Signal device for dogs to follow |
| Sun screen | |
| Salt | |
| Some first aid | |

The Special Search Dog Pack and Process for Faster Dog Aided Search, Dog Only Search and Rescue and other Dog Aided Uses 30 operates with various commands to send the search dogs:

| | |
|---|---|
| Return. | If no sent, follow tree line, follow river, head to higher/lower ground, follow other scents like smoke, food scents, etc. |
| Return if not on a scent. | |
| Stay. | |
| Follow other dog/s. | |
| Split from other dog/s | |
| Follow helicopter for pickup | Bark loudly |
| Circle back | Hide. |
| | Signal alarm if pouch becomes detached |

The handler can send and receive signals through the satellite phone, microphone, speaker and transmitter-receiver. The signals received back to handler could be such as:

| | |
|---|---|
| Return | If no scent, follow tree line, follow river, head to higher/lower ground, follow other scents like smoke, food scents, etc. |
| Return if not on a scent | |
| Stay | |
| Follow other dog/s | |
| Split from other dog/s | |
| Follow helicopter for pickup | Signal alarm if pouch becomes detached |
| Circle back | Signal if pack falls off. |
| Bark loudly | Signal if dog barks for different reasons. Ex: Scent ends, danger, snow or water too deep, etc. |
| Hide | |
| Rest | |

FIG. 4 is a sketch of a general scent 96 search with a remote handler. Seen here are: a Search and Rescue Device 30 pack or case strapped to search dog 35; an animal/rescue dog 35; a human Rescue Trainer/handler/commander/owner 40 or aa remote handler 45 using speaker 98 on search dog 35; a victim 50; a traditional Liquid Replenishment 70; an old time traditional pack 75 with assist dog; a zone of Victim Scents 80; and a scent search 96 by search dog 35.

FIG. 5 is a sketch of the general search 100 with the search dog 35 and team 93 at the site and a remote handler 45. In this sketch is shown: a Search and Rescue Device 30 pack or case strapped to search dog 35; an animal/rescue dog 35; a human Rescue Trainer/handler/commander/owner 40 or a remote handler 45 using speaker 98 on search dog 35; a victim 50; a boost tower 88; a completed path 90 of search dog 35; a future path 95 of search dog 35; and a remote search 100.

Figure 6:
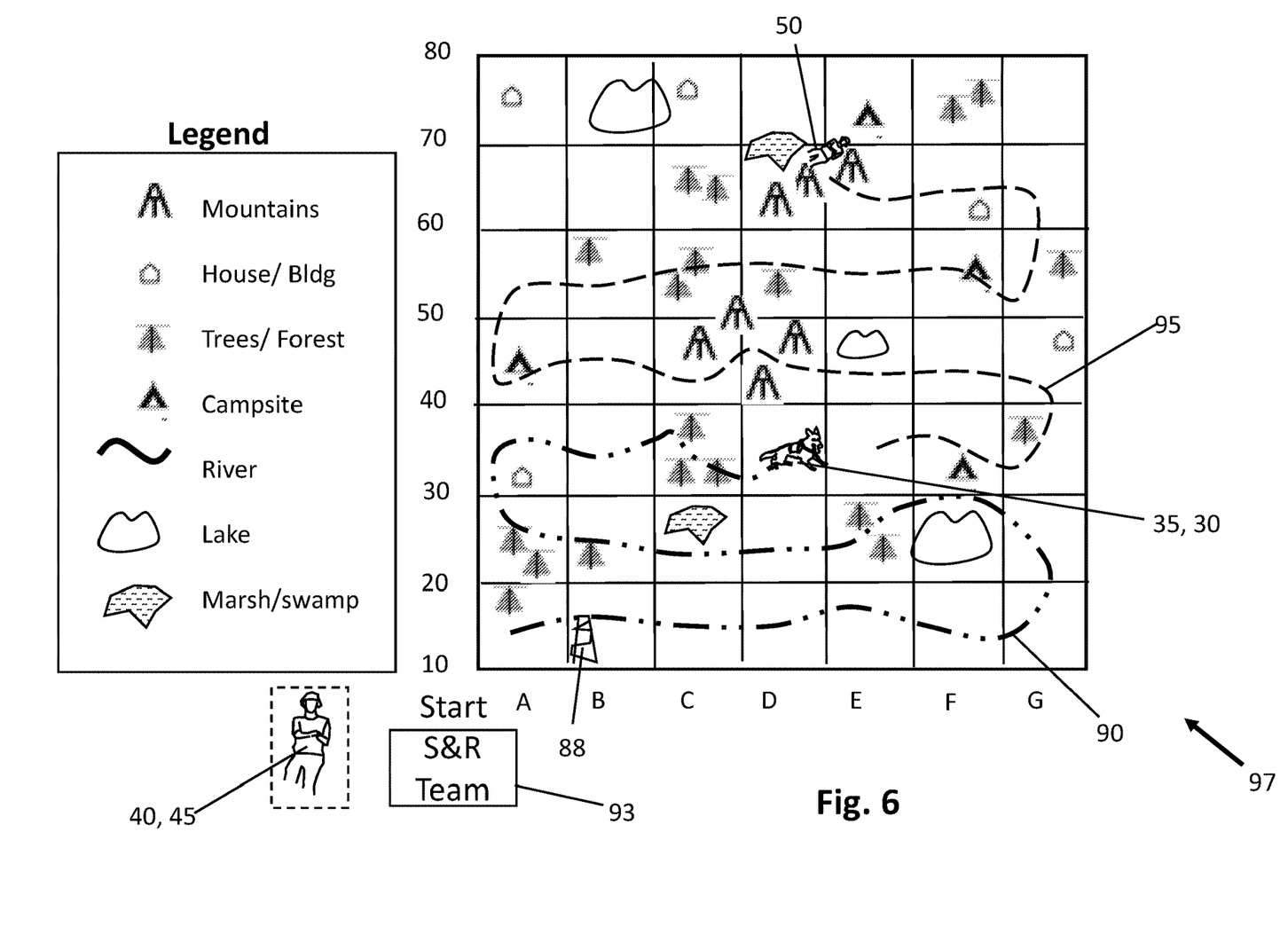
FIG. 6 is a grid search with a search dog and Search and rescue team on site and a remote handler.

FIG. 5 is a grid search 97 with a search dog 35 and Search and rescue team 93 on site and a remote handler 45. Demonstrated in this sketch is: a Search and Rescue Device 30 pack or case strapped to search dog 35; an animal/rescue dog 35; a human Rescue Trainer/handler/commander/owner 40 or a remote handler 45 using speaker 98 on search dog 35; a victim 50; a search and rescue team 93 at site; a future path 95 of search dog 35; a scent search 96 by search dog 35; and a grid search 97 by search dog 35.

FIG. 7 is a process flowchart 110 for a remote dog search activity. This chart shows the unique remote search and rescue process as:
  Step 1. Prepare and Train
    a. Choose accomplished search dog and handler
    b. Prepare pack device with attachments
    c. Train with attachments—transmitter and receiver, microphone and speakers, camera/s (2D, 3D, 360 degrees), etc., smoke detectors, wired or wireless clip-on finger health monitor for human so that a doctor or trained health care provider can monitor the person, health monitor for the dog, heat sensors, verbal, audible, and/or mechanical commands, two-way narrative (victim or other human);
d. Initially train initially with a handler present, then advance to the handler remote; and
e. Practice grid, open area, scent and structured, on and off trails, and etc. command searches.

Step 2: Train with Auxiliary Devices
a. One or more Dog Handler/s and/or Caretaker/s, etc. can take dogs to a designated point and release them. The Dog Handler will take over remotely controlling the dog thru commands remotely broadcasted to the dog from the handler on-site or X distance away;
b. practice grid layouts, open area, scent and structured, on and off trails, and etc. command searches practice over various terrains—mountains, forest, streams, lakes, marshes, and urban settings, scent and structured and unstructured command searches;
C. Coordinate camera images with satellite map images; and
D. Practice deploying boost towers at location of search, (if needed).

Step 3: Identify Target Victim
a. Identify the Target victim;
b. Obtain as much information about the victim and circumstances as feasible;
c. Identify a last known location of the victim and set up perimeter time lost X speed of travel
d. Obtain scented items of victim if available
e. Coordinate satellite telescopes, real time mapping Step 4: Select Team and Search
a. Select Search and Rescue Team
b. Determine Scent, Grid or directed search
c. Select Dog and Handler
d. Travel with emergency gear to search location and set up boost tower and command post to remote hand Step 5: Search
a. Release Search Dog;
b. Prepare for contact with victim—first aid, call and/or place on stand-by a helicopter/airlift and/or drone;
c. Adjust/modify search if find signs/property of victim;
d. Coordinate Handler directions with satellite mapping; and
e. Release Drone from the search dog if needed.

Step 6: Contact with Victim
a. Determine condition—alive, injured, critically injured, dead, good health but lost or missing gear
b. Deploy additional search dogs with supplies
c. Steer victim/hiker back to trail and road;
d. Send airlift helicopter or pick-up team Step 7: Conduct a Post Search Review
a. Conduct Lessons Learned
b. Replenish supplies
c. Repeat Search and Rescue with remote handler.

When a person is deemed missing, instead of assembling a search team of people and dogs:

| | |
|---|---|
| Beacon pings as dog and handler get closer to one another | Dog returns at set point if their device commanding them fails. |
| Dog stops and stays when a person is found no matter what shape they're in | Camera attached and remotely turned on to save on battery life |
| Dogs probably spend more energy pulling against the handler. | GPS tracks the dogs |

When watching videos of S&R with dogs, it seems that the dogs are pulling against the trainer while the trainer is pulling back expending unneeded energy from both dog and handler. The dogs seem, to me to be able to leave the trainer far behind while staying on the scent. With this new device and process, the backpacks would be preloaded and ready to be put on the dogs in seconds then loaded into the transport. (See contents); the dog's pack easily converts into fanny pack for humans; the dogs would be transported to where someone was missing; the dogs would be given a scent or find a scent and then let loose; the dogs could be given commands. (See commands); the pouch converts into a fanny pack for humans; there are specific command signals for dogs; the pack has a unit that only a humans can turn on; a signal is given off when a dog has been at certain location for predetermined amount of time; a remote activated satellite phone camera and video is included; a clear protective pouch in on dog's pouch for the satellite phone; and the pack is loaded with essentials for survival.

Search dogs 35 can be handled, told, commanded, directed etc. by the remote handler 45 with devices attached to the dog or pack. By using a transmitter/receiver 81 the owner/commander/handler 45 can command the search dog 35 during the search from a remote position. The commander 45 is afar/distant from the search dog 35. The search dog(s) can be directed/handled/commanded wirelessly from anywhere with suitable communications. The commander/handler could be with the search dog, remote but on site and in the general area, or thousands of miles away from the dog in a room with satellite maps, thermal sensors, high powered telescopes coordinating the search and directing the on-site search dog 35. A Handler 45 can give commands over the Internet from anywhere that a device is usable to communicate directly to the receiver/transmitter of the Search dog. Right now or with current technology that is most likely a satellite phone via computer. Commands can be given to the dogs from the dog handler after assessing the situation without the handler ever setting foot on the ground.

Handlers 45 can see and hear from the transmitter device 81 and microphone 84 and see via the camera 86 from the pack 30 on the dog 35. The transmitter device 81 could be connected to the satellite phone 91 or even be the satellite phone itself.

As discussed above, Commands may be voice, noises, audible sounds, prodding, etc. Visual as well as audio communications can be obtained from the dogs wearing the satellite phone 91 or by humans/and victims 50 once satellite phone 91 is obtained from the search dog 35. Search dogs by remote commands by the handler to the Search dogs could be used for guides to lead victims and lost people out or to safety. A search dog could indicate back to handler that a person is found. Also, a search dog could give a response if it's not the person the search was looking to encounter. A search dog could indicate articles found that may help Search and Rescue to strategize a better plan, or what may be happening to a victim such as hyperthermia. In addition, a search dog could be sent out to check for fires after storms or holidays in high prone areas. Smoke sensors could be added to packs for help finding people with camp fires, illegal fires, on fire bands, etc. A search dog could be sent to out to find illegal activities, such as poaching, illegal fishing, illegal removal of plants, etc. The search dog could check people fishing license by people showing the dog's camera their licenses. Handlers could talk directly to people fishing.

Search and rescue dogs 35 can start the search any time of the day or night. Search dogs 35 can be sent out much quicker than humans and can move through brush and thickets, thick forests, narrow mountain trails, across streams and rivers etc. Search dogs can cover distances much quicker with remote handlers/or without physical onsite handlers.

Search dogs could be used as the primary contacts and actors. On one call, several Search dogs could make trips never have to send humans out—in inclement weather, terror alerts, fire storms, wind, sand storms, fog etc. Can start Search dogs in most any weather and no handlers needed on site. Assessments of the conditions, the trails, weather conditions, can be accessed and determined instantly, without any humans help. For determining what items to bring for the exact conditions of the emergency and rescue—such as ropes, if foot bridge is washed out, things to cross with, animal control, a victim is trapped in a tree seeking refuge from a dangerous animal; a person pinned or trapped under a fallen tree or rock, or fallen into a cave or crevice and cannot escape, etc.

With the backpack of the Search dog one can switch the dog pack over to a human backpack or Fanny pack. Humans could have had the pack taken in by the agile Search dogs/animals and provide the victim with needed emergency supplies—food, water, telephone, batteries, ammunition, fire starters, etc. Dogs backpack can be fitted with the proper supplies for changing conditions. Such as dogs dispatched from the same location may have deserts in the lower areas and high mountains so a lost person up high in the mountains warmth will be their biggest concern while down low in the desert would be dehydration. Food and water for the dog could be dispensed by remote control, though the search dog could also eat power bars or the like intended humans but can be eaten by both human or dog.

Search and Rescue improvements to the physical hardware and software can be constantly updated or improved upon as technology advances with this same overall search and rescue process. Extra commands can be added as better training or more experienced Search dogs become available because of the flexibility of the computer aided or Artificial Intelligent interface with the devices.

In addition, by using this process and commands, Search dogs 35 could be trained to work in multiple teams with various commands when one or a single Search dogs isn't enough. This may be when one is rescuing or pulling heavier people out of danger, when there is a group lost (boy scouts, ski or hiking groups, etc. Or possibly when weather requires sending or supplying a tent for nighttime, or severe inclement weather (snow storm, sand storm, hurricane conditions, etc.). One or more tents plus food and water plus communications can prove to be too heavy for just one dog and the supplies must be divided among more Search dogs.

Ultimately, even a small drone can be sent out and deployed from dog's pack. This small drone can provide communication uplinks back to command or immediate surveillance of an area to indicate weather changes or even enemy presence in a terror or wartime event.

Search dogs can communicate back through the receiver and transmitter to the handler also for when a scent is lost, or a victim is found, etc. Sending information back the handler can be by barking or such even to answer questions by handler that only the dog can answer as to certain smells, scents getting stronger or weaker, hearing faint sounds and the like. A search dog could indicate when it is in trouble by simply communicating back to the handler.

When search dogs can have information such as descriptions, photographs and other documentation on their pack describing whom they are looking for. This can be shown to other passers-by. The passer-by could even be they themselves that are being sought by the search effort. For example, they are on an extended hiking or camping journey or ski trip and have no direct link to the outside world when an emergency occurs that needs their attention (illness, death of a family member, or other unforeseen happenstance. Possibly they are past due or sought for an emergency and they are needed back quickly.

If a primary Search dog that has lost its pack and/or lost contact with a remote handler, it could be singled by other secondary handlers and a secondary Search dogs that could seek and find the first search dog. The primary handle could communicate with that primary Search dog through the transmitter receiver of the secondary and control the primary dog or by dog giving out commands by another handler.

Other devices such as camera/s, microphones, speakers, lights and sensors, recorders, tablets could be plugged directly or indirectly into the satellite phone or the communicator. Likewise battery packs or even solar panels could provide needed electrical power to devices of the victim by the search dog. A light weight generator or solar pack that charges from the search dog's walking motion can even help to keep batteries charged.

Once a person or victim is contacted or found by the search dog, a different type of search and rescue crew can be assessed at that point. It can be as obvious as retrieving a body, bring medical supplies, preparing for a person that has a broken bone. Further, if the person in good health but only a far distance from the trail, the victim or lost person could be talked back or directed back to the trail from the satellite position obtained by the satellite phone. With search and rescue now knowing the GPS location of the person, items sent by a secondary dog might anticipate potential dangers such as snake bite kits, frost bite, dehydration, etc. The victim or person/s once found can be efficiently and quickly resupplied with needed essentials such as water, food, medicine, etc. and can be determined by the search and rescue team, a doctor and or an additional dog. Again, the secondary dog can be sent in place or ahead of a human personnel much more quickly.

Once a search and rescue team is on site and additional supplies are needed if applicable, the search dog could be sent back to get added supplies and return much quicker than a human can. Once the victim is found, doctors could remotely monitor the victim and with the victim's help, veterinarians could remotely monitor the health and wellbeing of the search dogs the entire time.

Search dogs can also wear a scent bag to help cover their scent plus give off a stronger scent. That provides a cover or can distinguish a scent laid by previous particular dog that was provided in before or earlier and distinguish the earlier dog from for the later dog to follow a certain scent. This means Different and distinguishing scents for different dogs.

Many uses are anticipated for the Special Search Dog Pack and Process for Faster Dog Aided Search, Dog Only Search and Rescue and other Dog Aided Uses 30. Some examples, and not limitations, are shown in the following List:

A. An overdue hiker in a wilderness area;
B. A missing child;
C. To help determine if an article was worn by a subject;
D. To help determine if a subject was in an area;
E. Military actions with special forces;
F. Military actions supplying forward observers;
G. Department of Natural Resource checking fishing and hunting licenses (camera and microphone);
H. Fire watches in remote areas; and I. Drone and balloon locations in remote areas—place a pre-scent on the drone or balloon before launch.
J. With the right set-up, Camera/s can be viewed by an indeterminate but large number/amount of people all at once in Two Dimensional (2D), Three dimensional (3D), virtual reality (VR) along with the stereo sound. The dog handler could be helped out by this large amount of people, and could even have multiple handlers with one dog, if so desired. Recordings could be played back at a later time for training, computer software upgrades, new technics added, maps updated.
K. Dogs could be sent out to record when no emergency is active just to record the trails for mapping in 2D or 3D, trail conditions, training, and etc.
L. Dogs could be used for a wide range of tacks when not needed for emergencies or even be train for specific tacks that are not emergency related.
M. Google has Google earth and Google maps. Why not Google trails? With or without Google send dogs on trails to do some VR recordings. Viewing trails, terrain, etc. could be used for entertainment or for training and such.
N. Once it is properly trained, the dog could go out with a lot of cameras, recorders, sensitive microphones, low light cameras, night-time color cameras, VR cameras with sound etc. etc. etc. and do a well-promoted Bigfoot hunt LIVE. The dog would best be suited to track, outrun, sneak-up-on and get close enough to record it, stay out of reach and etc. Dogs should be trained to respect these and all other animals. Some other real or legendary creatures are the Moth-Man, Chupacabra, Loogaroo, La Llorona, Skunk Ape, to name a few. Compared to the dog, human hunters now are not physically suitable to track and/or encounter some of these creatures.

An answer to "WHAT SEARCH DOG TEAMS ARE ABLE TO DO": Trailing dogs are trained to follow the path that a missing person has taken. Similar to traditional "tracking" dogs, these dogs require a properly preserved scent guide and should not be distracted by other people in the area. These dogs usually work on long leashes. Trailing dogs most frequently work trails that are several days old. Area search dogs are trained to find any human scent in an area. These dogs work most frequently off-leash and can cover large areas. Search dogs can be helpful in a variety of situations in the wilderness. When someone is reported lost or overdue, volunteer search and rescue (SAR) dog teams are available to respond, day or night, to help in the search effort. SAR dogs can find: Children lost in the wilderness, parks or hidden in shrubbery around houses; Old people who have wandered away from homes and hospitals; Hikers and hunters lost in the woods; Victims of drowning accidents; Victims of avalanche, earthquake, flood, explosion, fire, train wrecks, plane crashes, tornadoes and other disasters. Also the SAR dogs could be let out of at both termination points of a trail or search zone—at the end of trail and simultaneously at the beginning. Just in case they got almost to the far end of the trail. A dog with handler can average 2 mph so in 6 hours, they could cover 12 miles before their 2 hour rest. A handler in good shape could hike 12 miles in an 8 hour period with a two hour rest for him and the dog. A SAR dog by itself can cover 50 miles in a day with the pack.

With this description it is to be understood that the Special Search Dog Pack and Process for Faster Dog Aided Search, Dog Only Search and Rescue and other Dog Aided Uses. Unless defined otherwise, all technical and scientific terms used herein have the same meaning as commonly understood by one of ordinary skills in the art to which these inventions belong. Although any methods and materials similar or equivalent to those described herein can also be used in the practice or testing of the present inventions, the preferred methods and materials are now described. All patents and publications mentioned herein, including those cited in the background of the application, are hereby incorporated by reference to disclose and describe the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A special search and rescue process with a search dog that is a specifically trained search and rescue (SAR) dog, and a pack for a faster search dog-only search that contains the following steps:

Step 1. Prepare and Train one or more Dog Handlers for a rescue wherein Step 1 is comprised of:
 a. Choose an accomplished search dog and a handler;
 b. Prepare a pack device with attachments;
 c. Train the search dog carrying a set of attachments wherein the attachments include a communication group consisting of a transmitter and a receiver, a microphone and a speaker, and a camera/s (2D, 3D, 360 degrees) wherein the type of attachments of the communication group is the same type as the attachments used to train the search dog and the attachments of the communication group further include a smoke detector, a clip-on finger health monitor for the target victim whereby a trained health care provider can monitor the target victim, a health monitor for the dog, a heat sensor, and a verbal, audible, and/or mechanical command unit for a two-way narrative between the target victim and the handler;
 d. Initially train the search dog with the handler present, then advance to having the handler remote from the search dog carrying the communication group set of attachments; and
 e. Practice whereby the handler practice grid, scent, and structured command searches with the search dog carrying the communication group set of attachments;

Step 2: Train the search dog with Auxiliary Devices;
Step 3: Identify a Target Victim;
Step 4: Select a Team;
Step 5: Perform a search with assistance of the search dog;
Step 6: Make contact with and rescue the target Victim; and
Step 7: Conduct a Post Search Review wherein the search dog and the one or more dog handler can complete the search without a dog handler being physically on-site.

2. The special search and rescue process with a search dog and a pack in claim 1 wherein Step 2: Train with Auxiliary Devices is further comprised of:
at least one Dog Handler/s and/or Caretaker/s
 a. takes the search dog to a designated point and release the search dog whereby the Dog Handler takes over remotely controlling the search dog thru commands remotely broadcasted to the search dog from the handler on-site or X distance away;
 b. practices grid layouts, open area, scent and structured, on and off trails, and command searches practice over various terrains—mountains, forest, streams, lakes, marshes, and urban settings, scent, and structured and unstructured command searches;
 c. coordinates any camera images with a satellite map images; and
 d. practices deploying a boost tower at location of search.

3. The special search and rescue process with a search dog and a pack in claim 1 wherein Step 3: Identify Target Victim is further comprised of:
 a. Obtain as much information and circumstances about the target victim as feasible;
 b. Identify a last known location of the target victim and set up a perimeter at a distance calculated as time since the target victim was lost multiplied by an estimated speed of travel by the target victim;
 c. Obtain one or more scented items of the target victim if available; and
 d. Coordinate any assistance from a satellite telescope and a real time mapping assistance.

4. The special search and rescue process with a search dog and a pack in claim 1 wherein Step 4: Select a Team is further comprised of:
 a. Determine a type from a Scent, a Grid an a directed search;

b. Select a Dog and a Handler; and
c. Travel with an amount of emergency gear to a selected search location and set up a boost tower and a command post to remotely command and handle the search dog.

5. The special search and rescue process with a search dog and a pack in claim 1 wherein Step 5: Perform a search with assistance of the search dog is further comprised of:
   a. Release the Search Dog;
   b. Prepare for contact with the target victim by alerting first aid and by calling and/or placing on stand-by a helicopter/airlift and/or a drone;
   c. Adjust/modify the search and rescue process if the handler finds signs/property of the target victim;
   d. Coordinate the handler's directions with a satellite mapping provider; and
   e. Release the helicopter/airlift and/or drone from the search dog if needed.

6. The special search and rescue process with a search dog and a pack in claim 1 wherein Step 6: Make contact with and rescue the target Victim is further comprised of:
   a. Determine condition of the target victim and if the target victim is alive, injured, critically injured, dead, in good health and is missing gear;
   b. Deploy additional search dogs with an amount of amount of food, water, and first-aid supplies;
   c. Steer victim back to trail and road; and
   d. Send the airlift/helicopter and/or drone or send a pick-up team.

7. The special search and rescue process with a search dog and a pack in claim 1 wherein Step 7: Conduct a Post Search Review is further comprised of:
   a. Conduct a review of Lessons Learned;
   b. Replenish the amount of food, water, and first-aid supplies; and
   c. Repeat Search and Rescue process with a remote handler.

8. The special search and rescue process with a search dog and a pack in claim 1 wherein the pack provided contains at least one special component.

9. The special search and rescue process with a search dog and a pack in claim 8 wherein the at least one special component is selected from a group consisting of a wireless transmitter and receiver with built in speaker and microphone, a small and powerful microphone, a Global Positioning Sensor (GPS), a multi-direction camera with a speaker and microphone, a smoke detector, a thermal detectors/heat sensor, a satellite telephone, a cellular telephone, a speaker, and a light.

10. A special search and rescue process with a search dog that is a specifically trained search and rescue (SAR) dog, and a pack for a faster search dog-only search that contains the following steps:
   Step 1. Prepare and Train at least Dog Handlers for a rescue;
   Step 2: Train the search dog with Auxiliary Devices;
   Step 3: Identify a Target Victim;
   Step 4: Select a Team;
   Step 5: Perform a search with assistance of the search dog;
   Step 6: make contact with and rescue the target Victim; and
   Step 7: Conduct a Post Search Review
      Step 1. Prepare and Train one or more Dog Handlers for a rescue—
         a. Choose an accomplished search dog and a handler;
         b. Prepare a pack device with attachments;
         c. Train the search dog carrying a set of attachments wherein the attachments include a communication group consisting of a transmitter and a receiver, a microphone and a speaker, and a camera/s (2D, 3D, 360 degrees) wherein the type of attachments of the communication group is the same type as the attachments used to train the search dog and the attachments of the communication group further include a smoke detector, a clip-on finger health monitor for the target victim whereby a trained health care provider can monitor the target victim, a health monitor for the dog, a heat sensor, and a verbal, audible, and/or mechanical command unit for a two-way narrative between the target victim and the handler;
         d. Initially train the search dog with the handler present, then advance to having the handler remote from the search dog carrying the set of communication group attachments; and
         e. Practice whereby the handler practice grid, scent, and structured command searches with the search dog carrying the set of communication group attachments;
   Step 2: Train the search dog with Auxiliary Devices—the at least one Dog Handler/s and/or Caretaker/s
         a. takes the search dog to a designated point and release the search dog whereby the Dog Handler takes over remotely controlling the search dog thru commands remotely broadcasted to the search dog from the handler on-site or a set distance away;
         b. practices grid layouts, open area, scent and structured, on and off trails, and command searches practice over various terrains—mountains, forest, streams, lakes, marshes, and urban settings, scent, and structured and unstructured command searches;
         c. coordinates any camera images with a satellite map images; and
         d. practices deploying a boost tower at location of search;
   Step 3: Identify a Target Victim—
         a. Obtain as much information and circumstances about the target victim as feasible;
         b. Identify a last known location of the target victim and set up a perimeter at a distance calculated as time since the target victim was lost multiplied by an estimated speed of travel by the target victim;
         c. Obtain one or more scented items of the target victim if available; and
         d. Coordinate any assistance from a satellite telescope and a real time mapping assistance;
   Step 4: Select a Team—
         a. Determine a type from the group consisting of a Scent, a Grid or a directed search;
         b. Select a Dog and a Handler; and
         c. Travel with an amount of emergency gear to a selected search location and set up a boost tower and a command post to remotely command and handle the search dog;
   Step 5: Perform a search with assistance of the search dog—
         a. Release the Search Dog;
         b. Prepare for contact with the target victim—by alerting first aid, calling and/or placing on stand-by a helicopter/airlift and/or a drone;
         c. Adjust/modify the search and rescue process if the handler finds signs/property of the target victim;
         d. Coordinate the handler's directions with a satellite mapping provider; and e. Release the helicopter/airlift and/or drone from the search dog if needed;

Step 6: make contact with and rescue the target Victim— a. Determine condition of the target victim and if the target victim is alive, injured, critically injured, dead, in good health and is missing gear;

b. Deploy additional search dogs with an amount of food, water, and first-aid supplies;

c. Steer victim back to trail and road; and d. Send the airlift helicopter and/or drone or send or a pick-up team;

Step 7: Conduct a Post Search Review— a. Conduct a review of Lessons Learned;

b. Replenish the amount of supplies; and c. Repeat Search and Rescue process with a remote handler wherein the search dog and the one or more dog handler can complete the search without a dog handler being physically on-site.

11. The special search and rescue process with a search dog and a pack in claim 10 wherein the pack provided contains at least one special component.

12. The special search and rescue process with a search dog and a pack in claim 11 wherein the at least one special component is selected from a group consisting of a wireless transmitter and receiver with built in speaker and microphone, a small and powerful microphone, a Global Positioning Sensor (GPS), a multi-direction camera with a speaker and microphone, a smoke detector, a thermal detectors/heat sensor, a satellite telephone, a cellular telephone, a speaker, and a light.

* * * * *